United States Patent
Bryant et al.

(10) Patent No.: US 7,957,306 B2
(45) Date of Patent: Jun. 7, 2011

(54) PROVIDING REACHABILITY INFORMATION IN A ROUTING DOMAIN OF AN EXTERNAL DESTINATION ADDRESS IN A DATA COMMUNICATIONS NETWORK

(75) Inventors: Stewart F. Bryant, Merstham (GB); Mike Shand, Cobham (GB); Gargi Nalawade, San Jose, CA (US); Robert Raszuk, Komorow (PL); Keyur Patel, San Jose, CA (US); David D. Ward, Los Gatos, CA (US); Clarence Filsfils, Brussels (BE); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 11/518,383

(22) Filed: Sep. 8, 2006

(65) Prior Publication Data

US 2008/0062986 A1 Mar. 13, 2008

(51) Int. Cl.
*H04L 12/26* (2006.01)
*H04L 12/66* (2006.01)
*G06F 15/16* (2006.01)

(52) U.S. Cl. ......... 370/252; 370/254; 370/401; 709/242
(58) Field of Classification Search .................. None
See application file for complete search history.

(56) References Cited

U.S. PATENT DOCUMENTS

| | | | |
|---|---|---|---|
| 5,953,312 A * | 9/1999 | Crawley et al. | 370/218 |
| 6,032,194 A | 2/2000 | Gai et al. | |
| 6,438,100 B1 * | 8/2002 | Halpern et al. | 370/218 |
| 6,934,763 B2 * | 8/2005 | Kubota et al. | 709/245 |
| 6,981,055 B1 | 12/2005 | Ahuja et al. | |
| 7,177,295 B1 | 2/2007 | Sholander et al. | |
| 7,181,533 B2 * | 2/2007 | D'Souza et al. | 709/242 |
| 7,197,040 B2 * | 3/2007 | Bressoud et al. | 370/401 |
| 7,209,975 B1 * | 4/2007 | Zang et al. | 709/238 |
| 7,215,644 B2 * | 5/2007 | Wu et al. | 370/248 |
| 7,233,593 B2 * | 6/2007 | Chavali | 370/392 |
| 7,236,575 B2 * | 6/2007 | Kim et al. | 379/114.07 |
| 7,355,983 B2 * | 4/2008 | Scudder et al. | 370/242 |
| 7,359,393 B1 * | 4/2008 | Nalawade et al. | 370/401 |
| 7,406,035 B2 * | 7/2008 | Harvey et al. | 370/218 |
| 7,408,941 B2 * | 8/2008 | Martini et al. | 370/395.53 |
| 7,420,958 B1 * | 9/2008 | Marques | 370/351 |
| 7,480,253 B1 * | 1/2009 | Allan | 370/252 |
| 7,483,387 B2 * | 1/2009 | Guichard et al. | 370/252 |
| 7,502,332 B1 * | 3/2009 | Chen | 370/255 |
| 7,519,009 B2 | 4/2009 | Fleischman | |
| 7,535,826 B1 * | 5/2009 | Cole et al. | 370/218 |

(Continued)

OTHER PUBLICATIONS

Anonymous, "IS-IS, Intermediate System-to-Intermediate System, ISO 10589," NetworkSorcery.com, downloaded May 21, 2007, pp. 1-4.

(Continued)

*Primary Examiner* — Gregory B Sefcheck
(74) *Attorney, Agent, or Firm* — Hickman Palermo Truong & Becker LLP

(57) ABSTRACT

An apparatus for providing reachability in a routing domain of a data communications network having as components nodes and links therebetween for a routing domain external destination address is provided. The apparatus is arranged to advertise destination address reachability internally to nodes in the routing domain and associate a reachability category with the internal advertisement of the destination address reachability.

41 Claims, 9 Drawing Sheets

U.S. PATENT DOCUMENTS

| | | | |
|---|---|---|---|
| 7,590,074 B1 * | 9/2009 | Dondeti et al. ............... 370/254 |
| 7,697,439 B2 * | 4/2010 | Martini et al. ................ 370/238 |
| 7,733,876 B2 * | 6/2010 | Davie et al. .............. 370/395.53 |
| 7,787,396 B1 * | 8/2010 | Nalawade et al. ............ 370/254 |
| 7,801,030 B1 * | 9/2010 | Aggarwal et al. ............. 370/228 |
| 2002/0093954 A1 | 7/2002 | Weil et al. |
| 2003/0007500 A1 | 1/2003 | Rombeaut et al. |
| 2003/0142682 A1 * | 7/2003 | Bressoud et al. ............. 370/401 |
| 2003/0233595 A1 | 12/2003 | Charny et al. |
| 2004/0213233 A1 * | 10/2004 | Hong et al. .................. 370/392 |
| 2004/0260825 A1 | 12/2004 | Agarwal et al. |
| 2005/0007950 A1 | 1/2005 | Liu |
| 2005/0068968 A1 | 3/2005 | Ovadia et al. |
| 2005/0265258 A1 * | 12/2005 | Kodialam et al. ............. 370/254 |
| 2006/0029035 A1 | 2/2006 | Chase et al. |
| 2006/0140190 A1 | 6/2006 | Lee |
| 2006/0187819 A1 | 8/2006 | Bryant et al. |
| 2006/0193247 A1 * | 8/2006 | Naseh et al. .................. 370/216 |
| 2006/0193252 A1 | 8/2006 | Naseh et al. |
| 2006/0209716 A1 * | 9/2006 | Previdi et al. ................ 370/254 |
| 2006/0239201 A1 * | 10/2006 | Metzger et al. ............... 370/252 |
| 2006/0291446 A1 | 12/2006 | Caldwell et al. |
| 2007/0005784 A1 | 1/2007 | Hares et al. |
| 2007/0011351 A1 | 1/2007 | Bruno et al. |
| 2007/0025270 A1 * | 2/2007 | Sylvain ......................... 370/254 |
| 2007/0041379 A1 | 2/2007 | Previdi et al. |
| 2007/0064702 A1 * | 3/2007 | Bates et al. ................... 370/392 |
| 2007/0091793 A1 | 4/2007 | Filsfils et al. |
| 2007/0091794 A1 | 4/2007 | Filsfils et al. |
| 2007/0091795 A1 | 4/2007 | Bonaventure et al. |
| 2007/0091796 A1 * | 4/2007 | Filsfils et al. ................. 370/228 |
| 2007/0180311 A1 | 8/2007 | Harvey et al. |
| 2007/0214275 A1 * | 9/2007 | Mirtorabi et al. ............. 709/230 |
| 2007/0214280 A1 | 9/2007 | Patel et al. |
| 2007/0260746 A1 * | 11/2007 | Mirtorabi et al. ............. 709/238 |
| 2008/0008104 A1 * | 1/2008 | Previdi et al. ................. 370/255 |
| 2008/0062986 A1 | 3/2008 | Shand et al. |
| 2008/0192627 A1 | 8/2008 | Lichtwald |
| 2008/0219153 A1 | 9/2008 | Shand et al. |
| 2010/0287305 A1 * | 11/2010 | Kompella ..................... 709/238 |

OTHER PUBLICATIONS

R. Callon, "Use of OSI IS-IS for Routing in TCP/IP and Dual Environments," Internet Engineering Task Force (IETF) Request for Comments (RFC) 1195, Dec. 1990, pp. 1-70.

D. Oran, "OSI IS-IS Intra-domain Routing Protocol" [republication of ISO 10589], IETF RFC 1142, Feb. 1990, 179 pages (see esp. pp. 21-24).

Y. Rekhter et al., "A Border Gateway Protocol 4 (BGP-4)," IETF RFC 1771, Mar. 1995, pp. 1-47.

O. Bonaventure et al., "Ordered convergence and fast reroute for BGP peering links," presentation to Department of Information Engineering, Catholic University of Louvain (UCL) (Belgium), Nov. 22, 2005, 52 pp. (see esp. p. BGP-FRR-52).

U.S. Appl. No. 11/518,405, filed Sep. 8, 2006, Final Office Action, Mailing Date Oct. 13, 2010.

* cited by examiner

PROVIDING REACHABILITY INFORMATION IN A ROUTING DOMAIN OF AN EXTERNAL DESTINATION ADDRESS IN A DATA COMMUNICATIONS NETWORK

FIELD OF THE INVENTION

The present invention generally relates to data communications networks.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One routing protocol used, for example, in the internet is Border Gateway Protocol (BGP). BGP is used to route data between routing domains such as autonomous systems (AS) comprising networks under a common administrator and sharing a common routing policy. BGP routers exchange full routing information during a connection session for example using Transmission Control Protocol (TCP) allowing inter-autonomous system routing. The information exchanged includes various attributes including a next-hop attribute. For example where a BGP router advertises a connection to a network, for example in a form of an IP address prefix, the next-hop attribute comprises the IP address used to reach the BGP router.

Edge or border BGP routers in a first AS (ASBRs) communicate with eBGP peers in a second AS via exterior BGP (eBGP). In addition BGP routers within an AS exchange reachability information using interior BGP (iBGP). As a very large number of routes may be advertised in this manner an additional network component comprising a route reflector is commonly provided which sets up a session with each BGP router and distributes reachability information to each other BGP router.

The border routers in respective AS's can advertise to one another, using eBGP, the prefixes (network destinations) reachable from them, the advertisements carrying information such as AS-path, indicating the AS's through which the route advertisement has passed including the AS in which the advertising border router itself is located, and a BGP Community attribute indicating the manner in which the advertisement is to be propagated. For example if an eBGP advertisement is received with Community attribute No-Advertise, then the border router receiving the advertisement does not advertise the route information to any of its peers, including other routers in its AS. When the routes are advertised internally using iBGP, additional information such as a local preference and a nexthop field are included. The local preference attribute sets a preference value to use of that particular route for example for a given set of prefixes such that where more than one route is available to other border routers in the AS they will select the route with the highest local preference. The next-hop attribute provides the IP address used for the link between the border router in the AS and its eBGP peer.

To reduce the amount of iBGP messages further, route reflectors may only advertise the best path for a given destination to all border routers in an AS. Accordingly all border routers will forward traffic for a given destination to the border router identified in the best path advertisement. Forwarding of packets within the AS may then simply use Interior Gateway Protocol (IGP) as described in more detail below where the IGP forwarding table will ensure that packets destined for the eventual destination will be forwarded within the AS towards the appropriate border router. Alternatively an ingress border router receiving incoming packets may tunnel the packets to the appropriate egress border router, that is, encapsulate the packets to a destination egress border router for example using IP or MPLS tunnels. The packets are then decapsulated at the egress border router and forwarded according to the packet destination header.

BGP is capable of supporting multiple address types for example internet protocol version 4 (IPv4), internet protocol version 6 (IPv6) and so forth, and each type of address is identified using an address family identifier (AFI) and a subsequent address family identifier (SAFI). The destinations reachable via a BGP route, for example the network components whose IP addresses are represented by one IP prefix, are referred to as the network layer reachability information (NLRI) in BGP.

Within each AS the routing protocol typically comprises an interior gateway protocol (IGP) for example a link state protocol such as open shortest path first (OSPF) or intermediate system-intermediate system (IS-IS).

The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node along that route. The next node repeats this step and so forth.

It is important to minimize packet loss in the case of network component failure, both intra-domain (eg IGP) and inter-domain (eg BGP). For example in the case of intra domain link failure ISP's use various techniques to react quickly to the failure while convergence is taking place including handling of the failures by other layers or implementing fast reroute techniques for example of the type described in co-pending patent application Ser. No. 10/340,371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein.

In the case of inter-domain failure, for example failure of peering links between AS's, convergence can take several seconds. In one mode of operation, in these circumstances, a BGP router attached to a failed eBGP peering link advertises a new LSP without the destination served by the failed link together with an iBGP withdraw message indicating that the destinations are not reachable. A solution to the problem of inter-domain failure has been described in co-pending patent application Ser. No. 11/254,469, filed Oct. 20, 2005, entitled "A Method of Constructing a Backup Path in an Autonomous System" of Clarence Filsfils et al ("Filsfils et al"), the entire contents of which are incorporated by reference for all purposes as if fully set forth herein. As described in Filsfils et al, in the case where an AS has links with multiple AS's serving respective sets of destinations or prefixes, a backup path is constructed in the case of failure of a link to a respective one of the multiple AS's by identifying alternate links serving the same set of destinations, providing per-prefix route protection.

Currently, when a prefix is advertised in iBGP, the routers contained in the AS must derive the reliability of (redundancy in) the external connection to each prefix themselves from the number of adverts they receive displaying connectivity to said prefix. This leads to a computational overhead which slows down iBGP convergence.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow diagram of the process at a receiving node within an AS;

DESCRIPTION OF EXAMPLE EMBODIMENT

An apparatus and method is described for providing reachability information in a routing domain of an external destination address in a data communications network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and method for providing reachability information in a routing domain of an external destination address in a data communications network
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, an apparatus for providing reachability information in a routing domain of a data communications network having as components nodes and links therebetween for a routing domain—external destination address. The apparatus is arranged to advertise destination address reachability internally to nodes in the routing domain and associate a reachability category with said internal advertisement of said destination address reachability.

In other aspects, the invention encompasses a computer apparatus and a computer-readable medium configured to carry out the foregoing steps.

2.0 Structural and Functional Overview

Figure 1:
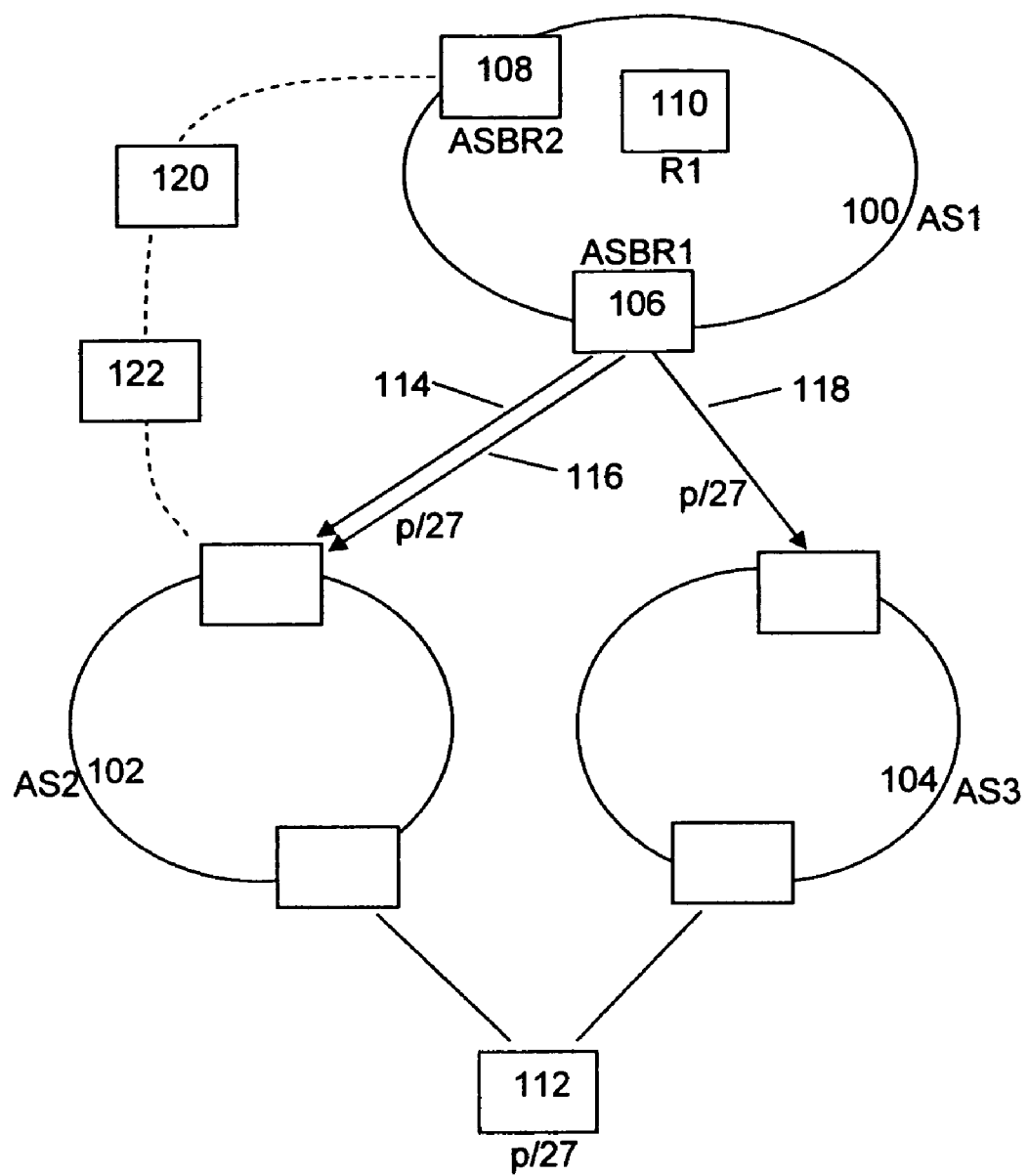
FIG. 1 is a network diagram illustrating a network in relation to which the approach can be implemented.
Figure 2:
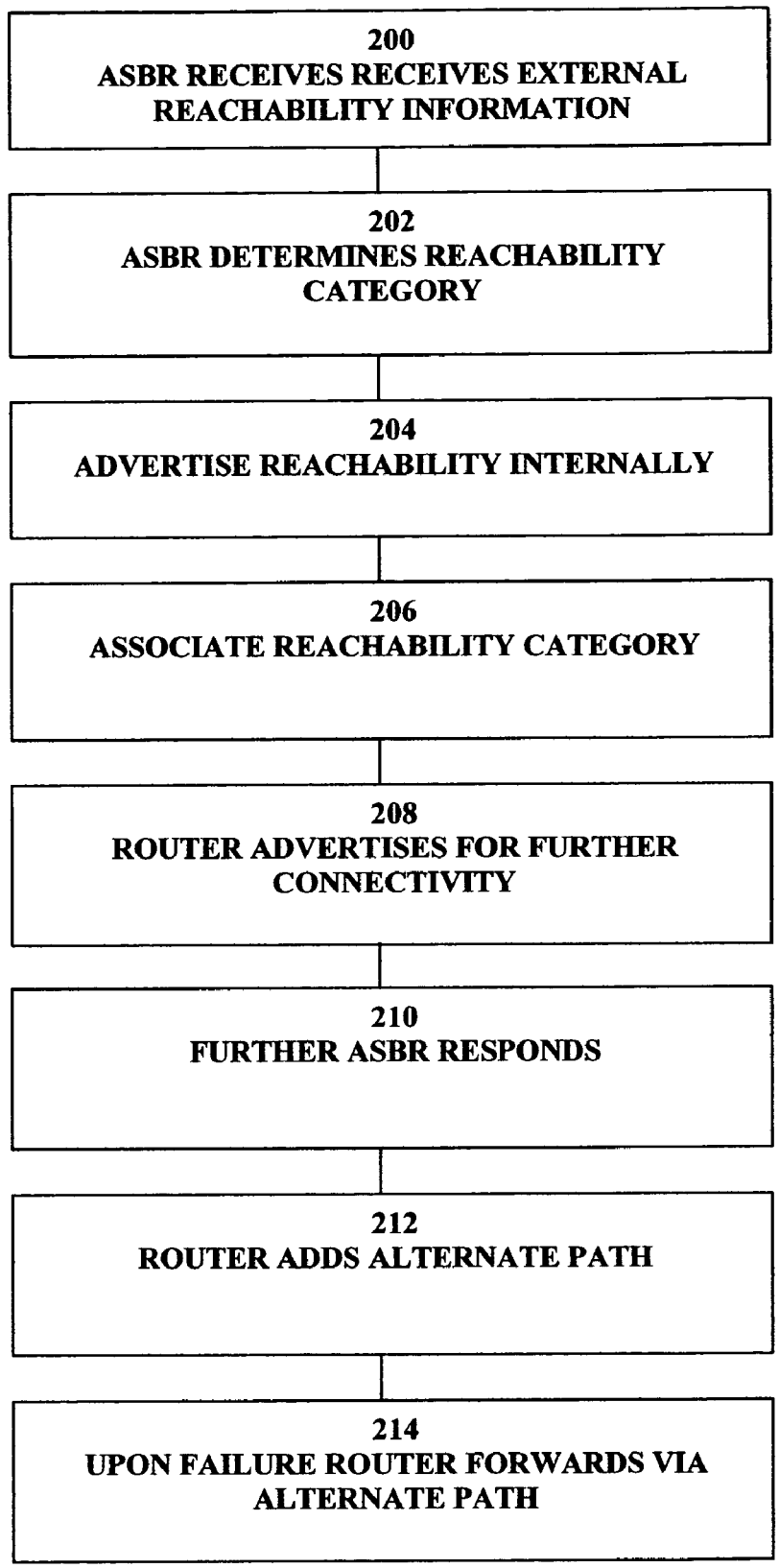
FIG. 2 is a is a flow diagram illustrating at a high level the steps involved in implementing the approach.

In overview an apparatus and method for providing reachability information in a routing domain such as an AS according to the approach described herein can be understood with reference to FIG. 1 which is a network diagram illustrating a network in relation to which the approach can be implemented and FIG. 2 which is flow diagram illustrating at a high level the steps involved in implementing the approach.

The network shown in FIG. 1 includes autonomous systems AS1, AS2, AS3 reference numerals 100, 102, 104. AS1 includes an ASBR1, reference numeral 106 which acts as an external reachability information receiving ASBR for the AS. AS1 further includes an additional ASBR2 reference numeral 108 which acts as a further external reachability information receiving node and an internal reachability information receiving node, and an internal node or router R1, reference numeral 110, acting as an internal reachability information receiving and advertising node. ASBR1 is connected to one or more ASs, AS2, AS3 providing connectivity to a destination address such as a prefix for example p/27. It will be appreciated that the network configuration shown, the connectivity and the destination address itself can be of any appropriate type and a simple configuration is provided in FIG. 1 for the purposes of clarity of explanation.

In order to provide reachability information, at step 200, ASBR1 receives external reachability information for example BGP connectivity information via eBGP. This may be received in the network of FIG. 1, for example from at least one of the ASs AS2, AS3 in relation to an external destination address such as p/27. At step 202 ASBR1 determines a reachability category from the received information in relation to the external destination address.

As can be seen from FIG. 1 and as will be discussed in more detail below, the reachability category would be dependent upon the external connectivity, external policy and local policy. For example in the network shown in FIG. 1, ASBR has a fully diverse path to p/27 via either of AS2 or AS3. In the absence of AS3 ASBR1 would have a parallel path represented by dual links 114, 116 to AS2. Alternatively again in the absence of AS2, ASBR1 would have only a single path 118 to p/27 via AS3.

At step 204 ASBR1 advertises the destination address reachability internally to nodes in the AS for example via iBGP. At step 206 the determined reachability category is associated with the internal advertisement for example as part of the iBGP advertisement in a community string. As a result a node receiving the iBGP advertisement in the network for example node R1 is able to derive additional connectivity information in relation to p/27 for example by comparison to a policy defining a threshold.

Accordingly at step 208 node R1 is able if necessary to advertise for further connectivity information. For example where the category was advertised in the form of an indicator indicating that only a single path is available to p/27 from ASBR1, router R1 may issue an internal advertisement seeking ASBRs within AS1 which also provides connectivity to p/27. For example referring to FIG. 1 ASBR2 may also provide connectivity albeit via additional hops 120, 122 and AS2. ASBR2 responds to the advertisement from R1 at step 210 and at step 212 the router can install this alternate path for example as a fast reroute path in the event of failure of ASBR or as a fast convergence path as appropriate. Indeed, in the former case, the advertisement from the router can additionally indicate that it is fast reroute capable and this can be factored into the response from the further ASBR2 providing additional connectivity information. Accordingly when connectivity failure to p/27 takes place then, at step 214, the router forwards affected packets via the alternate path.

Accordingly it will be seen that both an ASBR such as ASBR1 and an internal router such as node R1 can provide reachability information relating to an external destination address, to other internal nodes, and to further ASBR's. In addition one or more further next best alternate paths can be advertised with a corresponding reachability category.

The addition of the BGP community string indicators reduces the computational overhead on iBGP convergence and provides information on suitable FRR paths. Network stability/reliability/redundancy/connectivity in the case of a link or node failure is enhanced with the prior knowledge of the existence of alternate paths and the ability to request help in finding an alternative path and the offer of being FRR capable.

Figure 3:
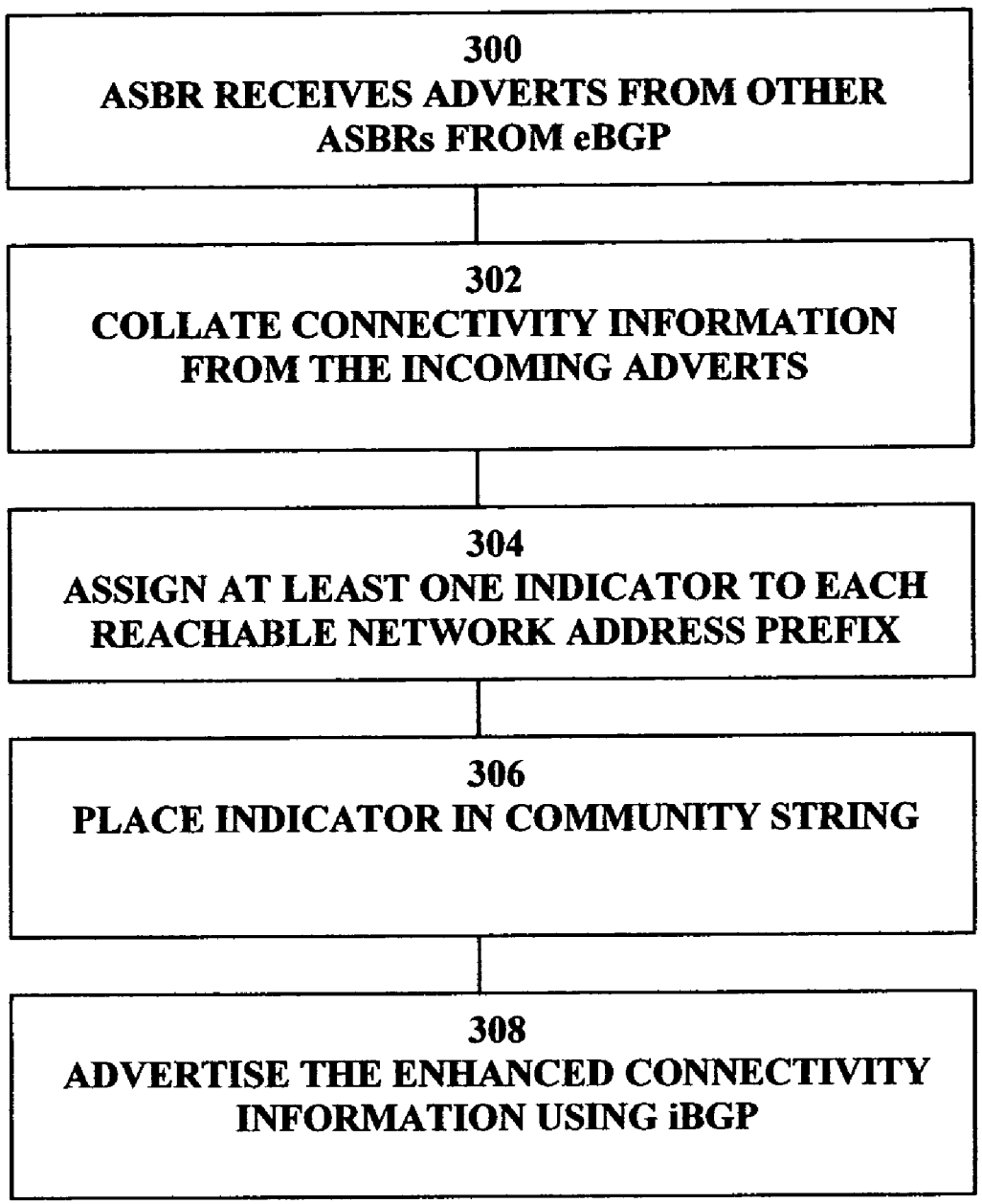
FIG. 3 is a flow diagram of the process at an ASBR.
Figure 4:
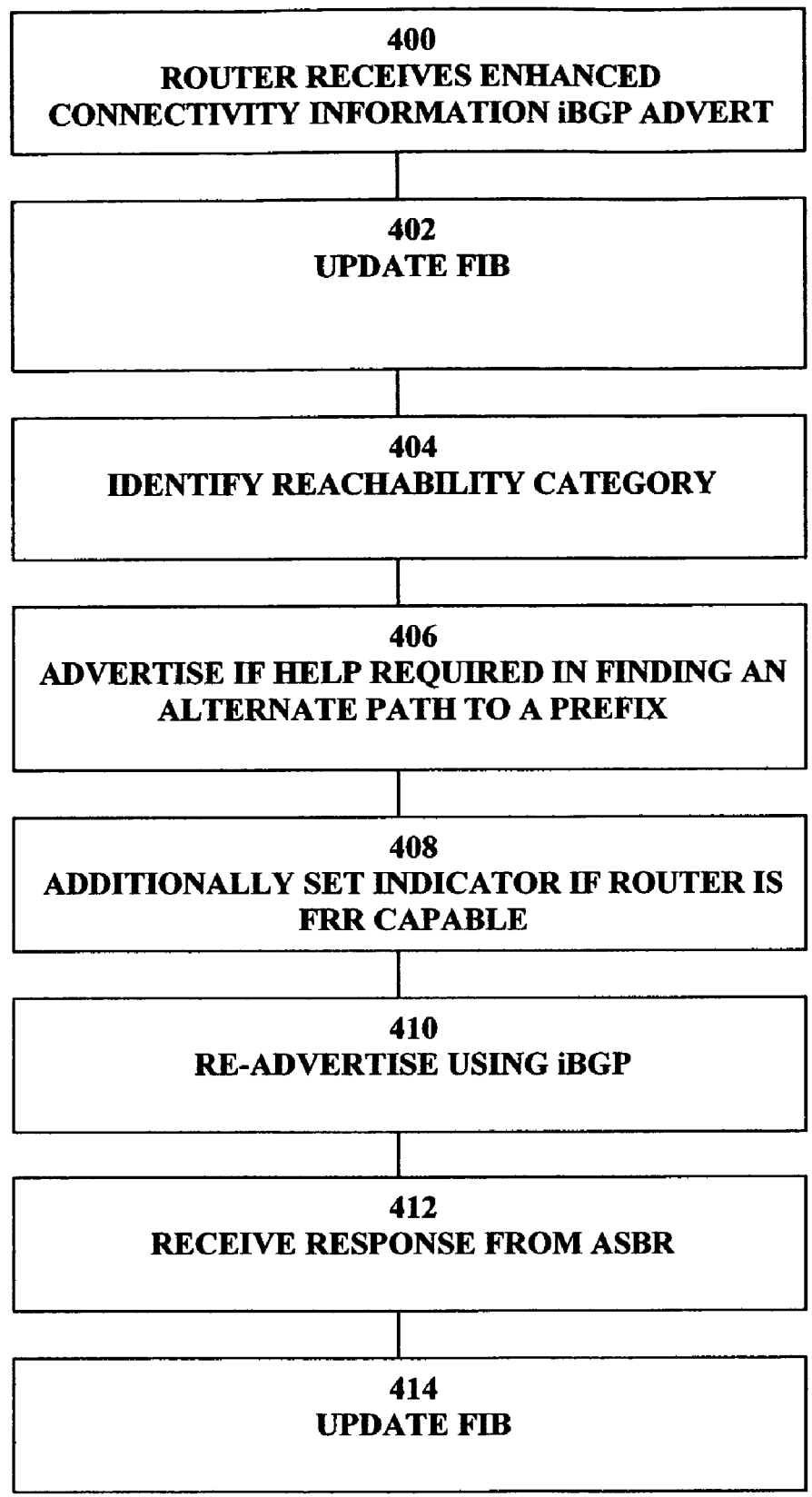
Figure 5:
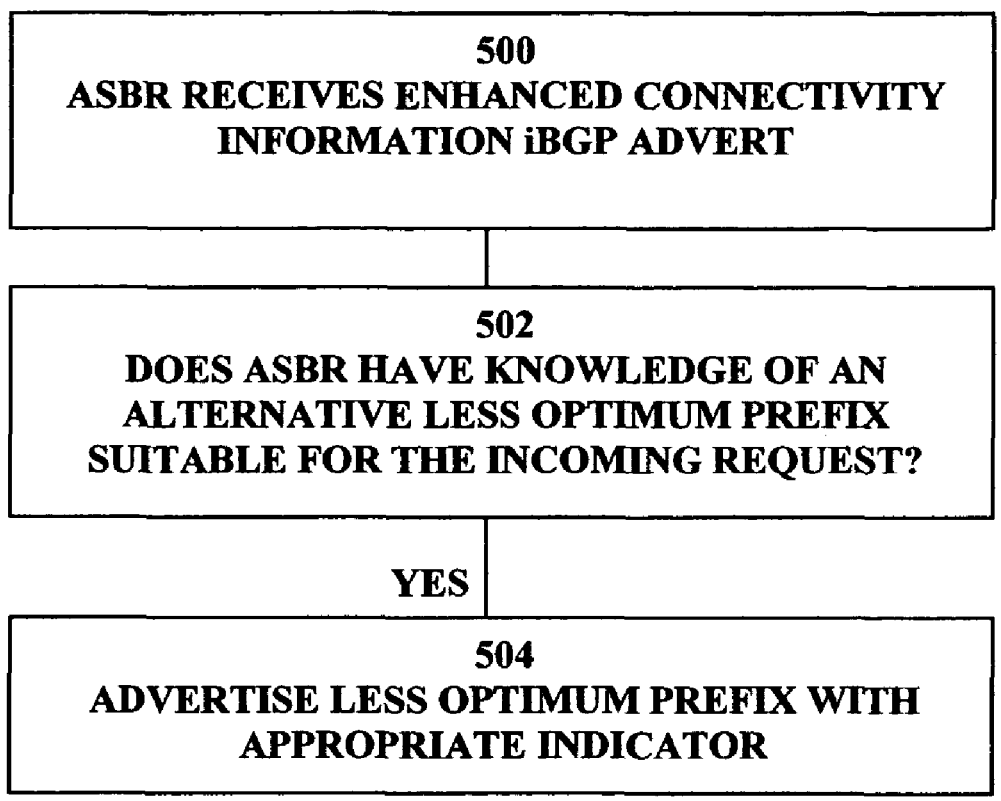
FIG. 5 is a flow diagram showing the steps performed at a further ASBR.

3.0 Apparatus and Method for Providing Reachability Information in an Autonomous System of an External Destination Address in a Data Communications Network Reference is made to FIG. 3 which is a flow diagram of the process at an ASBR such as ASBR1, FIG. 4 which is a flow diagram of the process at a receiving node within an AS and FIG. 5 which is a flow diagram showing the steps performed at a further ASBR such as ASBR2.

Referring firstly to FIG. 3, at step 300, incoming eBGP adverts are received at ASBR1 from ASBRs of other ASs in the data communications network and, via iBGP, from other ASBRs in its own AS. At step 302, the receiving ASBR collates all the incoming adverts and builds up knowledge of the network address prefixes it has connectivity or reachability to and determines the nature of the reachability to each individual prefix. According to the reachability derived, a category or indicator is assigned to each reachable individual network address prefix as discussed in more detail below. At step 306 an IBGP advertisement for the respective prefix is constructed and the indicator is placed within the community string field of the iBGP message.

At step 308 the receiving ASBR advertises the enhanced connectivity information using IBGP internally within AS1.

Figure 6:
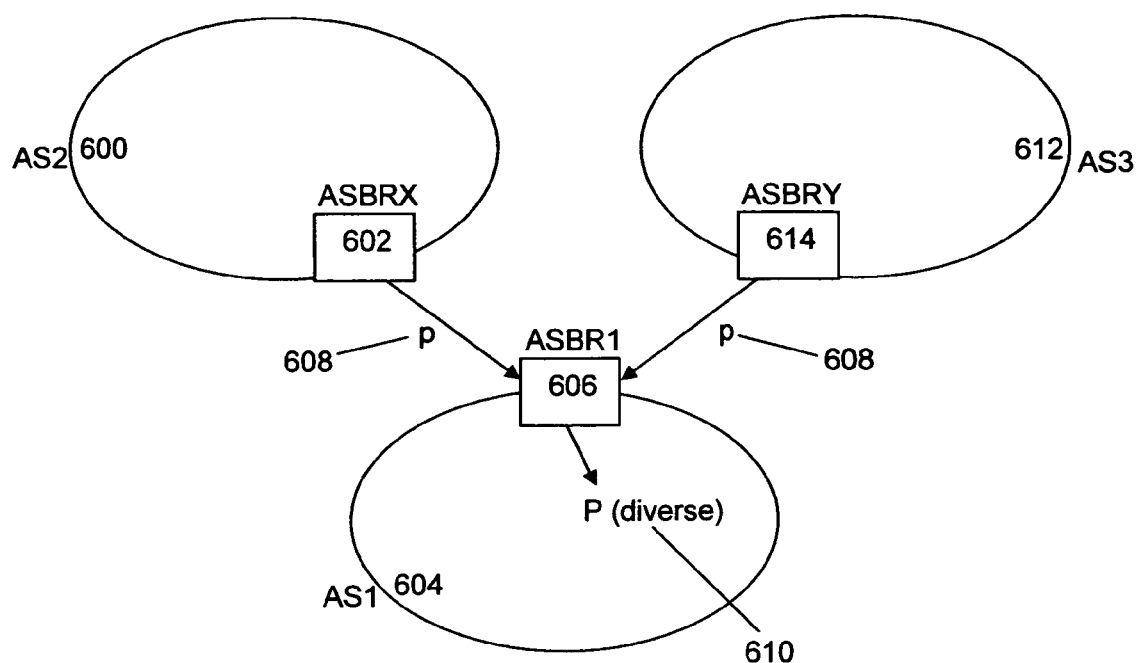
FIG. 6 is a schematic diagram of a network having diverse paths from an AS to a prefix, p.

The category can indicate, for example, the level of redundancy available in connectivity between the ASBR and the prefix. FIG. 6 is a schematic network diagram illustrating one possible scenario where ASBRs X and Y, 602 and 614 contained within ASs AS2 and AS3, 600 and 612 each advertise in eBGP connectivity information to a prefix,p 608. ASBR1 606 contained within AS1 604 receives these adverts and concludes that it has completely diverse paths to prefix, p via ASBRX 602 in AS2 600 or ASBRY 614 in AS3 612. This provides protection against both link failure between AS1 604 and one of AS2 and AS3 600 and 612 and failure of either ASBRX 602 or ASBRY 614. AS1 604, therefore, is provided with connectivity to prefix, p that is diverse against any failure except the failure of AS1 604 itself. Routers residing in AS1 604 are given knowledge of this diverse path to prefix p by ASBR1 606 advertising prefix, p in iBGP accordingly 610 via the community string indicator as described above.

Figure 7:
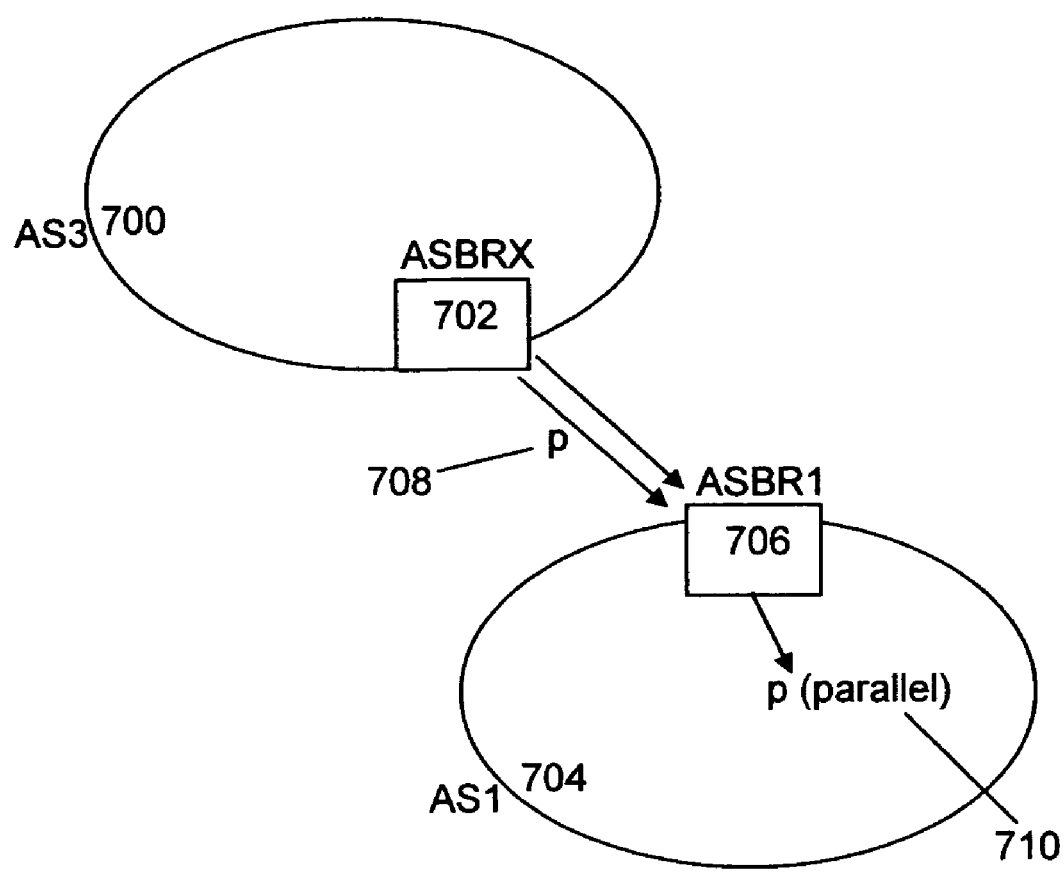
FIG. 7 is a schematic diagram of a network having a parallel path from an AS to a prefix, p.

An alternative scenario can be understood with reference to FIG. 7 which is a schematic network diagram. In particular ASBR1 706 in AS1 704 identifies parallel paths to ASBRX 702 in AS2 700. Hence ASBR1 will advertise, together with the prefix advertisement in iBGP, an indicator indicating that parallel paths are available.

Figure 8:
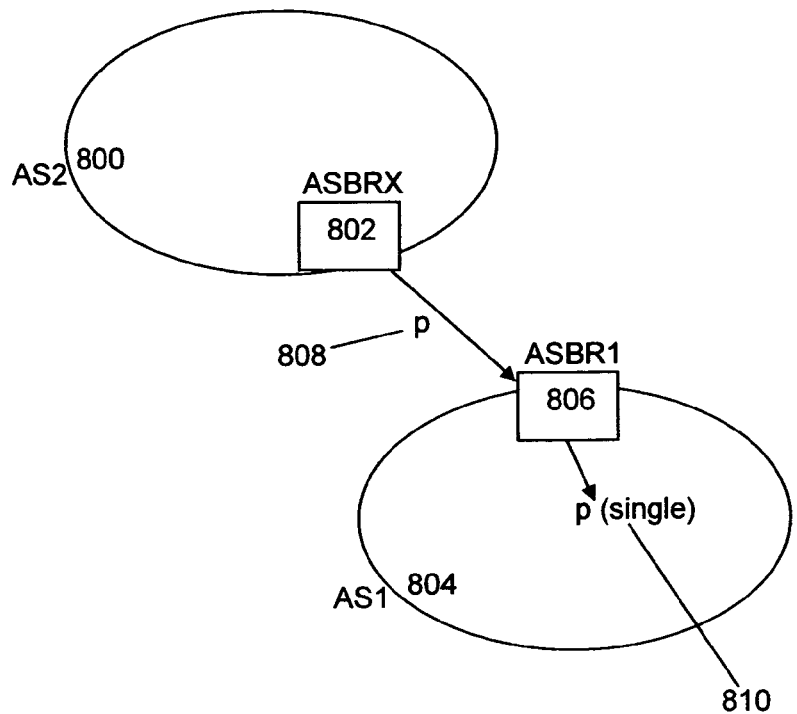
FIG. 8 is a schematic diagram of a network having a single path from an AS to a prefix, p.

A further scenario is shown in FIG. 8 which is an illustrative network diagram. In this case ASBR1, 806 in AS1 804 has a single path to prefix P via ASBRX 802 in AS2 800. Once again the fact that only a single link is available is advertised in conjunction with the iBGP advertisement.

It will be noted that the specific form of the indicator can take any appropriate type such as setting of one or more appropriate bits, or any other appropriate coding recognisable by the other components in the AS. It will be noted that an indicator associated with a particular prefix does not necessarily accurately represent the actual network arrangement. To accommodate this, an ASBR may in effect set a particular path to a network address prefix as optimum or non-optimum by setting a corresponding indicator regardless of the actual network arrangement and the router will then take appropriate action in a policy dependent manner as discussed below.

Turning to the steps performed at a router R1 in AS1 as shown in FIG. 4, at step 400 the IBGP advert including the enhanced connectivity information in the form of the category indicator is received by a router R1 internal to AS1. At step 402 R1 updates its RIB (which then leads to the FIB being subsequently updated) according to normal operation, and at step 404 R1 examines the category indicator.

The router R1 may have prior knowledge of the degree of reachability required for each individual network address prefix it has access to for example in the form of a policy and can compare this with the advertised enhanced connectivity information. The steps taken in relation to the reachability category for a given prefix may then be determined according to the policy. For example in all cases the router may require at least one further path as well as additional paths if there is a single point of failure. In the embodiment described herein, however, in the case of a "diverse connectivity" indicator (the scenario at FIG. 6), no further backup information is generally required as redundancy already exists in the path. Routers within AS1 604 who have visibility to the iBGP advert and who are satisfied with this level of protection need take no further action regarding path protection.

In the case of the scenario shown in FIG. 7, where ASBR1 advertises parallel prefixes to prefix p, routers may elect to rely on that redundancy and not seek further protection paths according to the embodiment described herein or may take other action if additional paths are considered to be required.

Referring to the scenario shown in FIG. 8 in which only a single path is available from ASBR1 to prefix p this is indicated correspondingly in the iBGP advertisement. The router R1 will recognise that this part of the network is potentially vulnerable as a single point of failure.

Reverting to FIG. 4, if a particular prefix may only be reached through such a path, and furthermore, this is deemed insufficient, the router at step 406 advertises the address in iBGP with the indicator in the enhanced connectivity information indicating the use of a single path and the need for a backup path to obtain FRR or FC assistance. In FC additionally, if a router is FRR capable, it may append a further indicator that it is FRR capable to the enhanced connectivity information stored in the community string of the iBGP advert 408. The enhanced connectivity information is then re-advertised by that router using iBGP 410.

At step 412 the router receives a response from the ASBR providing alternate connectivity and at step 414 the router holds the information in the RIB (in the case of fast convergence) or the presence of the alternative route can be used to speed up convergence by switching immediately to it before waiting for the full BGP convergence. If the information if FRR capable the node can actually repair to it immediately updates its forwarding tables appropriately (in the case of fast re-route) for example by providing the alternate nexthop for the alternate computed path for use in the event of notification of withdrawal of the primary route.

FIG. 5 shows the steps at an ASBR that receives a 'help' request. At step 500 the ASBR, for example ASBR2 in FIG. 1, receives the enhanced information including the "help" indicator that a router requires further connectivity following review of the category indicator it received via IBGP from the ASBR1. At step 502 ASBR2 assesses whether it can provide any connectivity to the advertised destination and if so responds to the advertising AS. Again, this transaction can be conducted using iBGP. Indeed ASBR2, upon receipt of a single path indicator ASBR2 can immediately advertise its alternate route for the prefix via IBGP.

Figure 9:
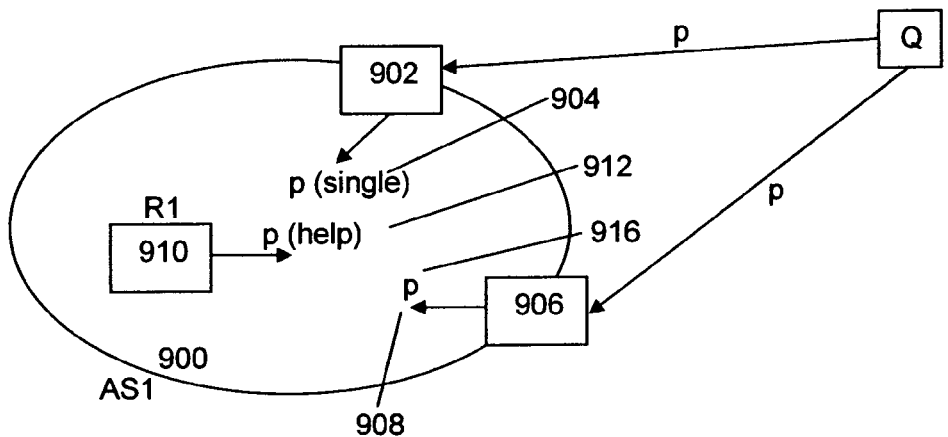
FIG. 9 is a schematic diagram of a network where an ASBR has the ability to ask for help with FRR or FC assistance.

The "help" indicator can be further understood with reference to FIG. 9, which illustrates a scenario where a router R1 910 within AS1 900 receives an indicator that prefix, p is reachable via a single path via AS 902. R1 asks for help with either FRR assistance or FC assistance. In order to request this help, the router 910 alters the indicator of the prefix, p in the IBGP message appropriately or constructs a new IBGP message and re-advertises the prefix, p with the "help" indicator 912. Upon receiving a prefix with a "help" indicator, another ASBR, say ASBR 906 may respond by advertising 908 a less optimum route for prefix, p with either a single, parallel or diverse indicator and as an FRR or FC target dependent on whether the FRR capable indicator was set. In particular, if the router that has the alternate path is FRR capable, it is telling the requestor that it has an alternate (less good) path, and that if the requestor sends it a packet using an IPFRR technique it will send the packet out of the AS—even if it has a "better" router via the AS and another ASBR. FRR capability is encoded within the help by mechanisms known to those skilled in the art.

As a result forwarding is improved in the event of a failure whilst reducing IBGP traffic and avoiding techniques such as automatic or policy controlled addition of routes in IBGP using techniques such as an "addpath" attribute.

The approach can be implemented in any appropriate network or environment using any appropriate protocol. The manner in which the method described herein is implemented may be using software, firmware, hardware or any combination thereof and with any appropriate code changes as will be apparent to the skilled reader without the need for detailed description herein.

4.0 Implementation Mechanisms—Hardware Overview

Figure 10:
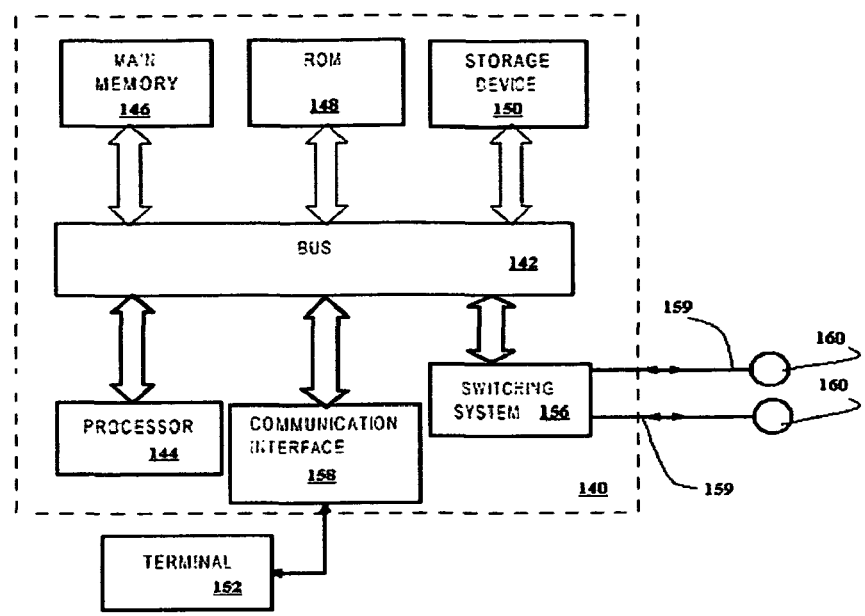
FIG. 10 is a block diagram that illustrates a computer system on which the method of using reachability information may be implemented.

FIG. 10 is a block diagram that illustrates a computer system 40 upon which the method may be implemented. The method is implemented using one or more computer programs running on a network element such as a router device. Thus, in this embodiment, the computer system 140 is a router.

The computer system 140 implements as a router acting as an external advertisement receiving node the above described method of forwarding data. Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as an internal or external advertisement receiving node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

Furthermore, the mechanism above of identifying network prefix address connectivity in the Community string of BGP is potentially usable in other protocols where a proportion of the protocol is reserved for the transport of network and connectivity information.

Where reference is made to BGP, eBGP or iBGP it will be appreciated that the approach can be applied in relation to any appropriate exterior or inter-domain protocol. The routing domain may comprise an AS, SRLG, or LAN, or any other network of interconnected components sharing a common routing protocol.

What is claimed is:

1. An apparatus for providing reachability information in a routing domain of a data communications network having as components nodes and links therebetween for a routing domain external destination address, the apparatus comprising:

a processor; and a computer-readable volatile or non-volatile storage medium comprising one or more stored sequences of instructions causing the processor to perform:

advertising, internally to nodes in a routing domain of a first autonomous system, whether two or more diverse external connections are available from the apparatus of the first autonomous system to a routing domain external destination address of a second autonomous system; and associating a reachability category, indicating a level of redundancy available in the two or more diverse external connections from the apparatus of the first autonomous system to the routing domain external destination address of the second autonomous system, with said internal advertisements of said two or more diverse external connections;

wherein the level of redundancy indicates both availability and quality of each of the two or more diverse external connections, and whether parallel external connections are available from the first autonomous system to the routing domain external destination address of the second autonomous system at the time of the advertising.

2. An apparatus as claimed in claim 1 further comprising instructions causing the processor to perform receiving external reachability information for the routing domain external destination address.

3. An apparatus as claimed in claim 2 further comprising instructions causing the processor to perform receiving a reachability category from the external reachability information.

4. An apparatus as claimed in claim 2 in which the apparatus is an edge router or border routers of an autonomous system and comprising an implementation of Border Gateway Protocol.

5. An apparatus as claimed in claim 1 further comprising instructions causing the processor to perform receiving an internal advertisement of one of the one or more external connections including the reachability category.

6. An apparatus as claimed in claim 5 further comprising instructions causing the processor to perform: comparing the reachability category with a reachability threshold and advertising the routing domain external destination address internally to obtain further reachability information.

7. An apparatus as claimed in claim 6 further comprising instructions causing the processor to perform: receiving the further reachability information, and updating routing or forwarding information with the further reachability information.

8. An apparatus as claimed in claim 7 further comprising instructions causing the processor to perform forwarding data using the further reachability information.

9. An apparatus as claimed in claim 6 in which the apparatus is an autonomous system router.

10. An apparatus as claimed in claim 6 further comprising instructions causing the processor to perform advertising internally a fast re-route capability.

11. An apparatus as claimed in claim 1 where the external reachability information comprises Border Gateway Protocol connectivity.

12. An apparatus as claimed in claim 11 where the external reachability information is received via eBGP.

13. An apparatus as claimed in claim 1 where the reachability category is advertised in iBGP.

14. An apparatus as claimed in claim 13 where the reachability category is advertised in a community string.

15. An apparatus as claimed in claim 1 where the routing domain external destination address is a destination address prefix.

16. An apparatus as recited in claim 1, wherein the level of redundancy further indicates whether diverse external connections are available, at the time of the advertising, from the first autonomous system to the routing domain external destination address of the second autonomous system.

17. An apparatus as recited in claim 1, wherein the level of redundancy further indicates whether an alternate external connection, available at the time of the advertising, from the first autonomous system to the routing domain external destination address of the second autonomous system is better or worse than a primary external connection.

18. An apparatus for providing reachability information in a routing domain of a data communications network having as components nodes and links therebetween for a routing domain external destination address, the apparatus comprising:
a processor; and
a computer-readable volatile or non-volatile medium comprising one or more stored sequences of instructions causing the processor to perform:
receiving, at a node in a routing domain of a first autonomous system, an internal advertisement from a router requesting further information about whether two or more diverse external connections are available from the node of the first autonomous system to a routing domain external destination address of a second autonomous system; and
responding with further information about whether the two or more diverse external connections are available, indicating a level of redundancy available in the two or more diverse external connections from the node of the first autonomous system to the routing domain external destination address of the second autonomous system, for the routing domain external destination address if the routing domain external destination address is reachable;
wherein the level of redundancy indicates both availability and quality of each of the two or more diverse external connections, and whether parallel external connections are available from the first autonomous system to the routing domain external destination address of the second autonomous system at the time of the advertising.

19. An apparatus as claimed in claim 18, further comprising instructions causing the processor to perform sending external reachability information for the routing domain external destination address.

20. An apparatus as claimed in claim 19, further comprising instructions causing the processor to perform sending a reachability category in the external reachability information.

21. An apparatus as claimed in claim 19, in which the apparatus is an edge router or border routers of an autonomous system and comprising an implementation of Border Gateway Protocol.

22. An apparatus as recited in claim 18, wherein the level of redundancy further indicates whether diverse external connections are available, at the time of the advertising, from the first autonomous system to the routing domain external destination address of the second autonomous system.

23. An apparatus as recited in claim 18, wherein the level of redundancy further indicates whether an alternate external connection, available at the time of the advertising, from the first autonomous system to the routing domain external destination address of the second autonomous system is better or worse than a primary external connection.

24. A non-transitory computer readable volatile or non-volatile storage medium comprising one or more sequences of instructions causing one or more processors to perform:
advertising, internally to nodes in a routing domain of a first autonomous system, whether two or more diverse external connections are available from the first autonomous system to a routing domain external destination address of a second autonomous system; and
associating a reachability category, indicating a level of redundancy available in the two or more diverse external connections from the first autonomous system to the routing domain external destination address of the second autonomous system, with said internal advertisements of said two or more diverse external connections;

wherein the level of redundancy indicates both the availability and quality of each of the two or more diverse external connections, and whether parallel external connections are available from the first autonomous system to the routing domain external destination address of the second autonomous system at the time of the advertising.

25. A computer readable medium as claimed in claim 24, further comprising instructions causing the one or more processors to perform receiving external reachability information for the routing domain external destination address.

26. A computer readable medium as claimed in claim 25, further comprising instructions causing the one or more processors to perform receiving a reachability category from the external reachability information.

27. A computer readable medium as claimed in claim 25, in which the one or more processors are part of an edge router or border routers of an autonomous system and execute an implementation of Border Gateway Protocol.

28. A computer readable storage medium as recited in claim 24, wherein the level of redundancy further indicates whether diverse external connections are available, at the time of the advertising, from the first autonomous system to the routing domain external destination address of the second autonomous system.

29. A computer readable storage medium as recited in claim 24, wherein the level of redundancy further indicates whether an alternate external connection, available at the time of the advertising, from the first autonomous system to the routing domain external destination address of the second autonomous system is better or worse than a primary external connection.

30. An apparatus comprising:
one or more processors; and
a network interface communicatively coupled to the one or more processors and configured to communicate one or more packet flows among the one or more processors in a network and a computer readable medium comprising one or more sequences of instructions causing the one or more processors to perform:
advertising, internally to nodes in a routing domain of a first autonomous system, whether two or more diverse external connections are available from the apparatus of the first autonomous system to a routing domain external destination address of the second autonomous system; and
associating a reachability category, indicating a level of redundancy available in the two or more diverse external connections from the apparatus of the first autonomous system to the routing domain external destination address of the second autonomous system, with said internal advertisements of said two or more diverse external connections;
wherein the level of redundancy indicates both availability and quality of each of the two or more diverse external connections, and whether parallel external connections are available from the first autonomous system to the routing domain external destination address of the second autonomous system at the time of the advertising.

31. An apparatus as claimed in claim 30, in which the computer readable medium further comprises instructions causing the one or more processors to perform receiving external reachability information for the routing domain external destination address.

32. An apparatus as claimed in claim 31, in which the computer readable medium further comprises instructions causing the one or more processors to perform receiving a reachability category from the external reachability information.

33. An apparatus as claimed in claim 31, in which the one or more processors are part of an edge router or border routers of an autonomous system and execute an implementation of Border Gateway Protocol.

34. An apparatus as recited in claim 30, wherein the level of redundancy further indicates whether diverse external connections are available, at the time of the advertising, from the first autonomous system to the routing domain external destination address of the second autonomous system.

35. An apparatus as recited in claim 30, wherein the level of redundancy further indicates whether an alternate external connection, available at the time of the advertising, from the first autonomous system to the routing domain external destination address of the second autonomous system is better or worse than a primary external connection.

36. A method of providing reachability information in a routing domain of a data communications network having as components nodes and links therebetween for a routing domain external destination address, the method comprising steps of:
advertising, internally to nodes in a routing domain of a first autonomous system, whether two or more diverse external connections are available from the first autonomous system to a routing domain external destination address of a second autonomous system, and
associating a reachability category, indicating a level of redundancy available in the two or more diverse external connections from the first autonomous system to the routing domain external destination address of the second autonomous system, with said internal advertisements of said two or more diverse external connections;
wherein the level of redundancy indicates both availability and quality of each of the two or more diverse external connections, and whether parallel external connections are available from the first autonomous system to the routing domain external destination address of the second autonomous system at the time of the advertising;
wherein the steps of advertising and associating are performed by one or more computing devices.

37. A method as claimed in claim 36, further comprising receiving external reachability information for the routing domain external destination address.

38. A method as claimed in claim 37, further comprising receiving a reachability category from the external reachability information.

39. A method as claimed in claim 37, in which the one or more computing devices are edge routers or border routers of an autonomous system and execute an implementation of Border Gateway Protocol.

40. A method as recited in claim 36, wherein the level of redundancy further indicates whether diverse external connections are available, at the time of the advertising, from the first autonomous system to the routing domain external destination address of the second autonomous system.

41. A method as recited in claim 36, wherein the level of redundancy further indicates whether an alternate external connection, available at the time of the advertising, from the first autonomous system to the routing domain external destination address of the second autonomous system is better or worse than a primary external connection.

* * * * *